United States Patent Office 2,891,731
Patented June 23, 1959

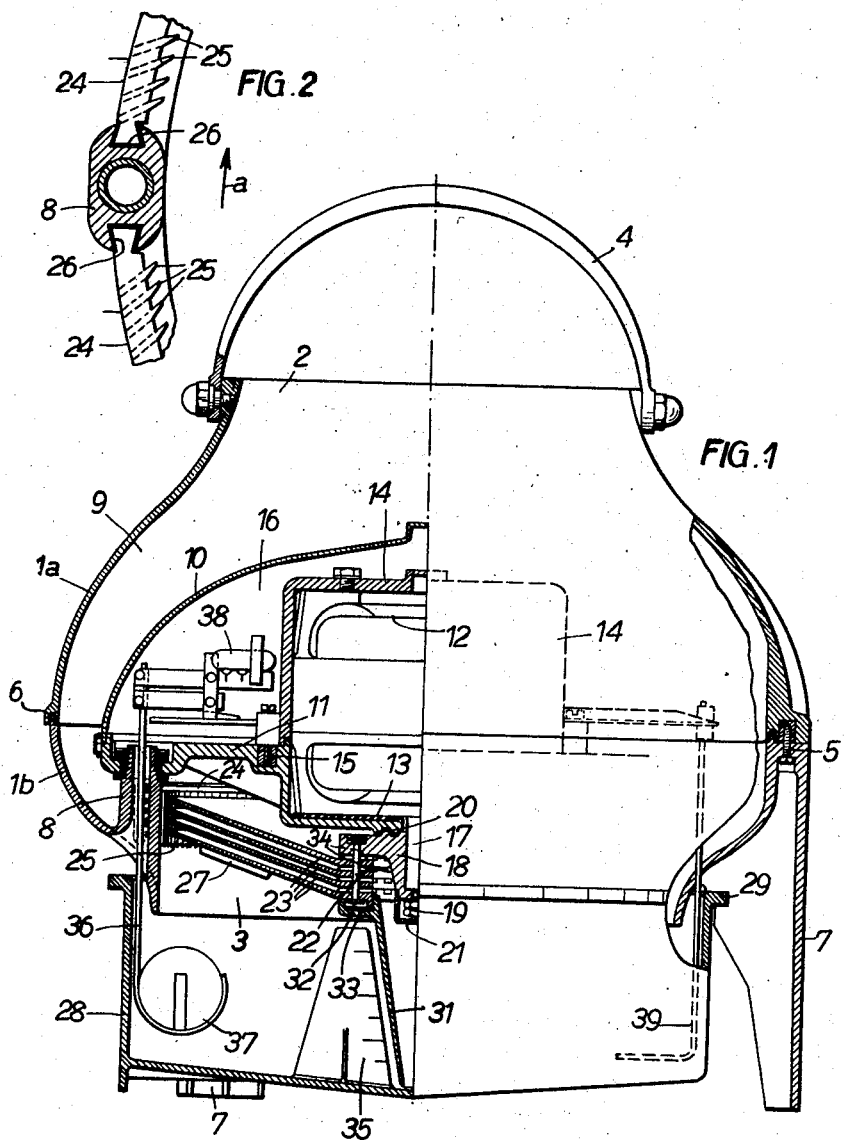

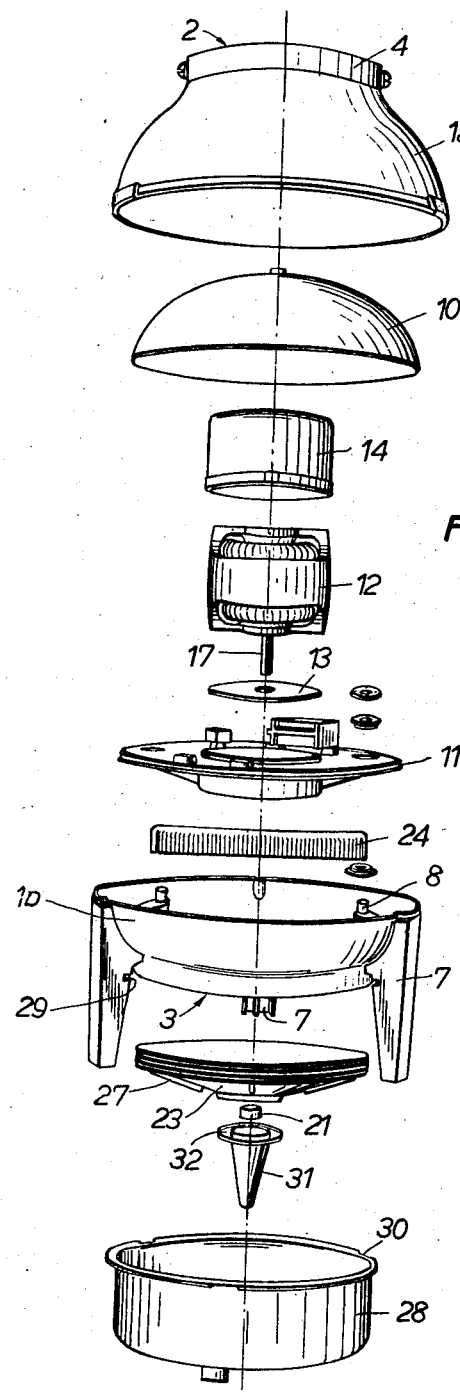

2,891,731

LIQUID ATOMIZER

Erwin Huber, Zurich, Switzerland, assignor to Aerosol Corporation T.R., Vaduz, Liechtenstein Application November 23, 1954, Serial No. 470,750

Claims priority, application Switzerland November 24, 1953

4 Claims. (Cl. 239—215)

The present invention relates to a liquid atomizer with a revolution-symmetric casing open at the top and bottom thereof, in which an electric-motor having a vertical shaft is arranged for the drive of a set of centrifugal discs, their circumferential rim being surrounded by a crown of atomizer blades, and having a suction tube extending through the lower casing and opening into a liquid container suspended from the casing.

It is an object of the invention to provide a liquid atomizer which is economical and reliable in operation and which permits to produce an unobjectionable aerosol. These features are particularly dependent upon the specific arrangement and construction of said elements and upon the manner of production and direction of the aerosol flow within the atomizer.

In this connection it is known by example to give the casing in axial section concave configuration and to form only the upper rim of the opening with a somewhat outwardly flaring edge or to form said rim cylindrically.

It is a further object of the invention to provide for favourable flow conditions within the atomizer casing without danger of recondensation of the atomized liquid. According to the present invention the interior surface of the casing in axial section is provided with a concave portion situated in the range of the largest casing diameter and continuously merging into a convex casing portion which extends to the upper opening of the casing, the ratio between the largest casing diameter and the diameter of the upper casing opening being at least substantially 1.85, while the diameter of the lower casing opening is at least equal to the diameter of the centrifugal discs.

Due to the described configuration, the relatively large propeller for feeding air, conventionally arranged in the range of the upper casing opening, can be omitted and replaced for instance by radial rims arranged at the lower side of the lowermost centrifugal disc and acting as feed blades.

Thereby an outlet channel is provided for the aerosol in the casing, which channel is completely free of any propeller and drive shaft.

In order that the invention may be better understood and put into practice one embodiment thereof is hereinafter described by way of example with reference to the accompanying drawings.

Fig. 1 shows the liquid atomizer in elevation with fragmentary longitudinal section, Fig. 2 is a cross-section through a hollow support with inserted blade crown-segments drawn to a larger scale, and Fig. 3 is an exploded view of the liquid atomizer.

The liquid atomizer shown in the drawings has a two-part casing 1a, 1b provided with an upper opening 2 and a lower opening 3. A pivotable carrying bracket 4 is secured to the upper rim of the casing portion 1a. The two casing portions 1a, 1b are interconnected by means of screws 5 and sealed by a packing ring 6, situated in a groove in the joining face of the casing portion 10, into which groove engages a corresponding rib at the joining face of the casing portion 1b.

The lower casing portion 1b is provided with feet 7 and has from its interior wall upwardly extending hollow supports 8.

As is shown in Fig. 1, the separating line of the rotation symmetric casing 1a, 1b is situated at the point of largest diameter of the casing. In this range the interior wall of the casing presents in longitudinal section concave configuration, this concave surface portion continuously merging towards the upper casing opening 2 into a convex surface portion. The ratio between the largest interior diameter of the casing and the diameter of the upper casing opening 2 is approximately 1.85. In a practical embodiment the largest casing diameter is e.g. 32 cm., the diameter of the upper casing opening being 17 cm. and the height of the upper casing portion being 16 cm. These values have proved to be suitable to provide for an unobjectionable flow of the aerosol in the casing.

The aerosol channel 9 in the casing exteriorly surrounded by the inside surface of the casing is interiorly limited by a cap 10, which is tightly but removably secured to a motor plate 11. The motor plate 11 is supported at the hollow support 8 and has a trough-like portion in its middle section, in which a part of the electrical drive motor 12 is arranged, which rests on a packing disc 13. A cap 14 covering the upper part of the motor is secured to the motor plate 11 by means of screws 15, thus forming together with the trough-like portion of this plate a cowling, which is tight with respect to the space of the casing in contact with the fluid to be atomized. The space 16 limited by the motor plate 11, the motor cap 14 and the exterior cap 10, which is also tight with respect to the rooms in which liquid to be atomized or the aerosol is present, is connected to the outside air over the hollow space of the supports 8. The vertical shaft 17 of the electrical motor 12 extends downwardly through the bottom of the motor plate trough and is provided with a thread at its free end. A hub body 18 seated on the shaft end is secured against axial displacement and rotation by means of nuts 19. The upper side of the hub body 18 is provided with a number of concentrically arranged ribs and grooves which in cooperation with corresponding ribs and grooves at the lower side of the motor plate trough form a labyrinth packing 20. The nuts 19 are covered by cap 21 arranged on the hub body 18. By means of axial screws 22 a set of by example four centrifugal discs 23 formed as buckets which open towards the top, are secured at the hub body. The centrifugal discs are suitably connected with each other by riveting. The diameter of the centrifugal disc 23 is slightly smaller than the diameter of the lower casing opening 3 and their circumference is surrounded by a blade crown formed by several annular segments 24. The annular segments consist of synthetic material and are produced by pressing or jet moulding. The blades formed at the segments are of such length and are arranged at such a distance from each other and inclined with respect to the radial direction that they overlap in this direction. It is to be remarked that it would not be possible to produce such overlapping, if the blades were stamped from a metal ring and bent up in a conventional manner. This overlapping of the atomizer blades is important since it prevents any liquid particles, which have been thrown off the discs 23 rotating in the direction of the arrow a (Fig. 2), from freely passing between the blades 25 into the aerosol channel 9. The annular segments 24 are inserted at their ends into dove-tailed grooves 26 in the hollow supports. Since these latter are the only means of support for the blade crown there is practically no stemming and no hindrance for liquid particles hitting the blades 25 from dropping down, as this is the case where the blade crown is supported with its underside on corresponding supporting elements.

The lowermost centrifugal disc 23 is provided at its underside with radial ribs 27 which act as feed blades for the production of the air flow necessary for the transport of the atomized liquid. The propeller which is provided in known apparatus of this kind within the range of the upper casing opening may thereby be omitted. In addition to the fact that the outlet opening of the aerosol channel 9 may be kept free of any elements protruding into the aerosol stream, it has proved advantageous to produce the air flow not by a suction effect but by pressure. This, together with the said dimensioning and configuration of the casing, results in the favourable flow conditions in the channel 9 and thereby in a particularly great effectiveness of the atomizer.

A container 28 is suspended by a circumferential rim from the feet 7 of the lower casing portion 1b. To this end recesses 29 are provided at the inner side of the feet 7, for engagement with said rim of the container. The rim is provided with recesses 30 spaced at a distance, which corresponds to the distance between the feet 7, (Fig. 3) thus permitting to mount or remove the container 28, if these recesses are brought into alignment with the recesses 29 in the feet 7.

The interior wall of the central opening of the lowermost centrifugal disc 23, which is extended by a downwardly projecting flange is provided with a screw thread. The connecting piece of a suction tube 31 projecting into the container 28 is screwed into this thread. An outer circumferential groove arranged at the connecting piece contains an annular packing 33 against which packing the downwardly extending flange of the lowermost centrifugal disc is pressed so that a tight connection is established between the suction tube and the centrifugal disc. The connection between the interior surface of the suction tube 31, at which the fluid swells up in a known manner when the apparatus is in operation, and the surface of the centrifugal disc 23, is provided by radial channels 34 within the disc body. At the bottom of the container 28 which is downwardly sloping towards its centre, a measuring plate is arranged by means of which the fluid level in this container can be read. At the same time the radially arranged measuring plate 35 serves to prevent a corresponding rotation of the fluid when the apparatus is in operation.

In order to provide for automatic interruption of the circuit of the motor 12 if a certain low level of fluid in the container is reached, a rod 36 is led through one of the hollow supports 8, which is provided with a float 37 at its lower end. The upper end of the rod 36 projecting into room 16 above the motor plate 11 is connected to a switch 38 arranged in the motor circuit. In the embodiment shown, this switch is a mercury tilting switch.

Further, an ionisation device is provided, its one electrode being constituted by the rod 36 suitably made of silver, its other electrode being constituted by a silver rod 39 projecting through the motor plate 11 and the lower casing portion 1b into the container 28.

All parts of the atomizer coming into contact with the liquid to be atomized or the aerosol flow, with the exception of the electrodes 36, 39, are suitably made of a synthetic material insensitive to the media used. The container 38 may consist of transparent synthetic material.

The apparatus described is not only advantageous with respect to its effectiveness but also with respect to its construction. The main parts of the apparatus may be assembled or disassembled in an extremely suitable manner. E.g. if the centrifugal discs are to be removed by example for cleaning, it is not necessary to disassemble the whole apparatus, but it is sufficient to remove the container 28, to unscrew the suction tube 31 and to remove the cap 31, whereupon the set of centrifugal discs together with the hub body 18 may be removed after loosening the screws 19, without disassembly of further apparatus parts e.g. the motor. On the other hand, the motor may be made accessible by removing the upper casing portion 1a and the two caps 10 and 14.

I claim:

1. A liquid atomizer comprising a casing of varying diameter and defining top and bottom openings, a revolution-symmetrical side wall of said casing including a concave wall portion situated in proximity of a part of the casing having the largest diameter and a convex wall portion provided in proximity of the top opening of the casing, said two portions continuously merging into each other, an electrical motor arranged in said casing and having a vertically directed shaft, a set of centrifugal discs in driven engagement with said motor shaft, a segmented crown of atomizing blades surrounding the circumferential rims of said centrifugal discs, a container for the liquid suspended from the casing, a suction tube extending into said container, the ratio between said largest diameter of the casing and the diameter of the top opening being substantially 1.85, and the diameter of the bottom opening being substantially equal to the diameter of the centrifugal discs the centrifugal discs being rigidly connected with each other to form a unit removably secured to the lower end of the motor shaft, said suction tube removably screwed to the unit formed by the centrifugal discs, said blade crown being formed by several segments consisting of synthetic material, the blades in said blade crown overlapping each other in radial direction, vertical hollow supports defining exterior grooves and upwardly extending from the interior wall of the casing, and dove-tailed end portions on said segments and exclusively supporting said segments on the corresponding exterior grooves of said vertical hollow supports.

2. A liquid atomizer as claimed in claim 1, wherein feed blades formed by radial ribs are provided at the underside of the lowermost centrifugal disc to create an air stream flowing from the lower casing opening through the atomizer blade crown towards the upper casing opening.

3. A liquid atomizer as claimed in claim 1, wherein said hollow supports carry a motor plate forming together with a cap removably screwed to said plate a motor cowling, a labyrinth seal being formed between said motor plate and said centrifugal disc unit, to seal the motor shaft downwardly extending out of the motor cowling, against the atomizing room.

4. A liquid atomizer as claimed in claim 3, wherein a float is arranged in the liquid container, said float controlling a cut-off switch for the motor circuit, by means of an actuation rod upwardly extending through one of the hollow supports, said switch being arranged on said motor plate.

References Cited in the file of this patent

UNITED STATES PATENTS

| | | |
|---|---|---|
| 1,346,811 | Diebold | July 20, 1920 |
| 2,554,867 | Mills | May 29, 1951 |
| 2,591,057 | Feldermann | Apr. 1, 1952 |
| 2,631,829 | Carraway | Mar. 17, 1953 |
| 2,658,169 | Barret | Nov. 3, 1953 |

FOREIGN PATENTS

| | | |
|---|---|---|
| 78,470 | Norway | Apr. 30, 1951 |
| 1,073,789 | France | Mar. 24, 1954 |